Sept. 12, 1944. J. HOHL 2,357,826
CAPPING MACHINE
Filed Dec. 7, 1942 7 Sheets-Sheet 1

Inventor
John Hohl
By Rule & Hoge
Attorneys

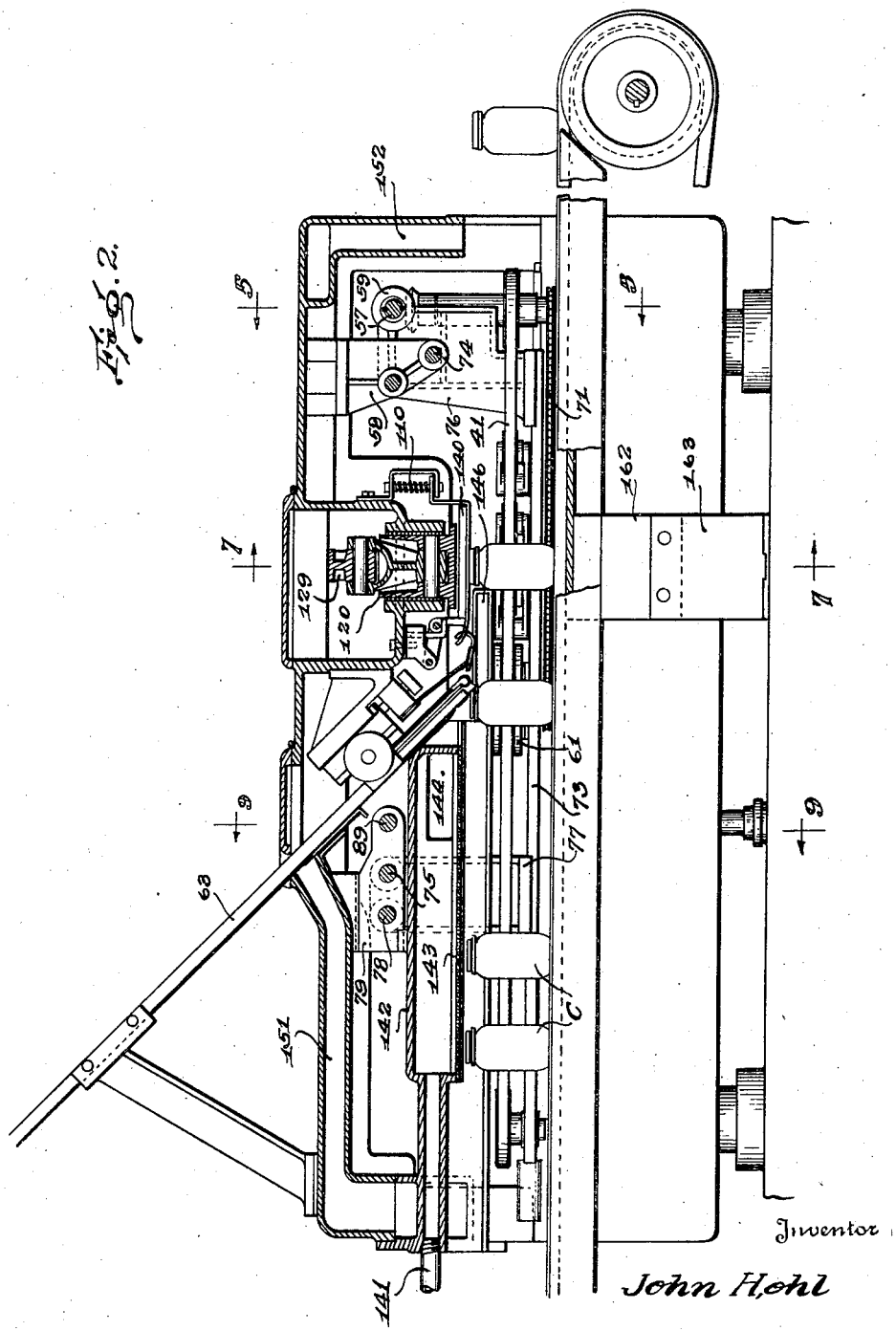

Sept. 12, 1944.  J. HOHL  2,357,826
CAPPING MACHINE
Filed Dec. 7, 1942  7 Sheets-Sheet 3

Inventor
John Hohl
By Rule & Hoge
Attorney

Inventor
John Hohl
By Rule & Hage
Attorneys

Inventor
John Hohl
By Rule and Hoge,
Attorneys

Sept. 12, 1944.  J. HOHL  2,357,826
CAPPING MACHINE
Filed Dec. 7, 1942  7 Sheets-Sheet 7

Inventor
John Hohl
By Rule & Hoge,
Attorneys

Patented Sept. 12, 1944

2,357,826

UNITED STATES PATENT OFFICE 2,357,826

CAPPING MACHINE

John Hohl, Toledo, Ohio, assignor to Owens-Illinois Glass Company, a corporation of Ohio Application December 7, 1942, Serial No. 468,095

5 Claims. (Cl. 226—80)

My invention relates to a machine for applying caps or closures to jars, bottles, or other containers and sealing the containers. The invention in its preferred form is embodied in a machine or apparatus herein disclosed as particularly adapted for applying lids or caps to jars which have been filled with any desired commodities, such as fruit, vegetables, or the like, which are packed and sealed while hot. The invention includes means for enveloping the jars or the open ends thereof and the caps in an atmosphere of steam during the capping operation.

An object of my invention is to provide a machine of the character indicated which is continuous in operation and adapted to carry the jars through a capping zone in which the caps are applied and sealed to the jars in rapid succession.

A further object of the invention is to provide novel mechanism for transferring the caps from a feed line or chute to the jars and quickly driving the caps to sealing position on the jars by the operation of a reciprocating ram.

A further object of the invention is to provide novel means by which the jars are supported and held stationary while the caps are being forced thereon to sealing position, without interfering with the continuous travel of the belt conveyor.

Other objects of the invention will appear hereinafter.

Referring to the accompanying drawings which illustrate a machine embodying my invention:

Fig. 2 is a part-sectional elevation, viewed from the opposite side of the machine, of the upper portion thereof through which the receptacle conveyor extends and which is vertically adjustable relative to the conveyor.

Fig. 3 is the sectional plan of the machine, the section being taken near the top of the upper casing.

Fig. 4 is a similar view, the section being at a lower plane illustrating more particularly the conveyor mechanism.

Figure 1:
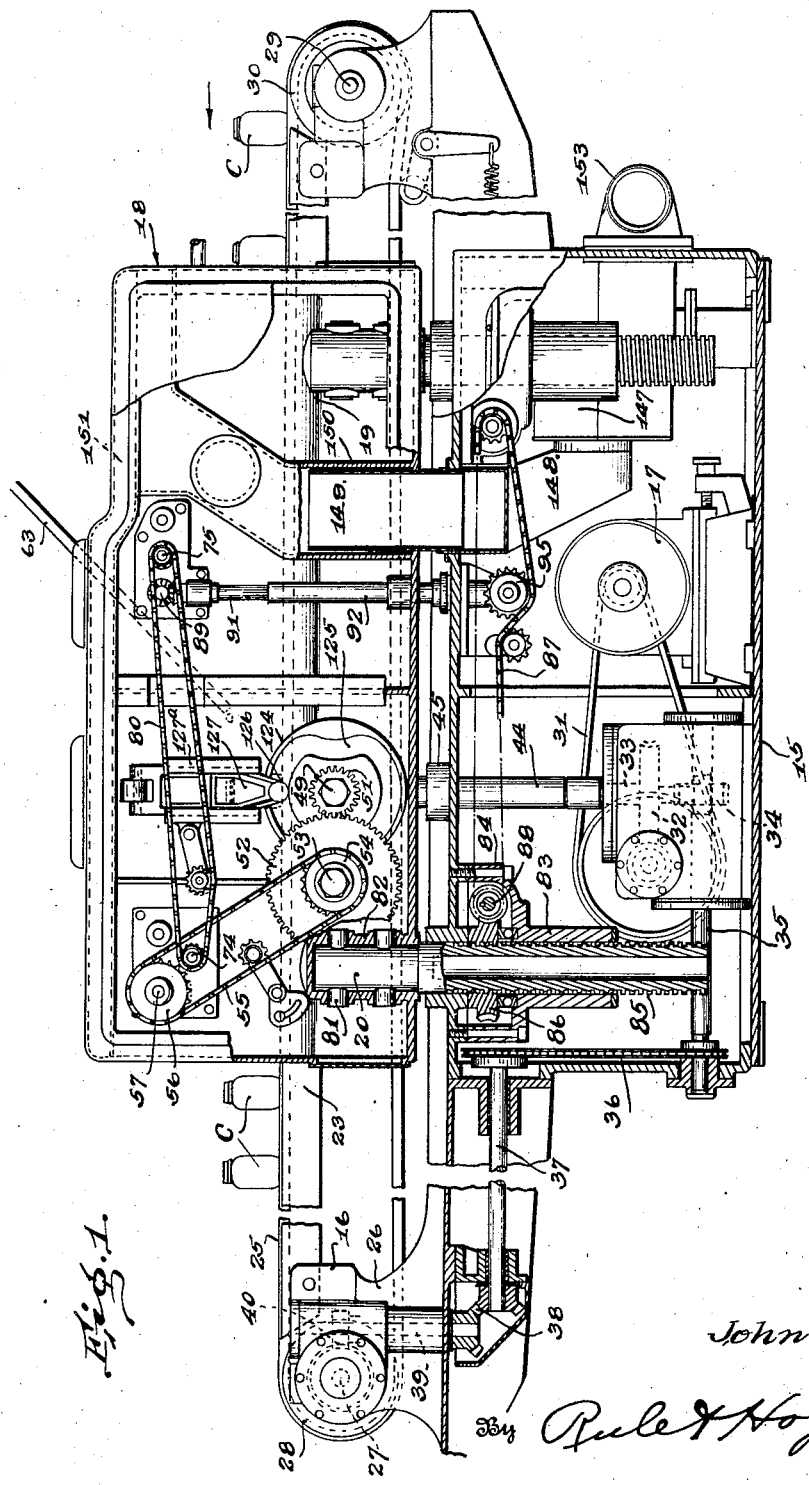
Fig. 1 is a part-sectional elevation of the machine.

The present application discloses subject matter disclosed and claimed in the copending joint application of Hohl and Bjering, Serial Number 468,094, filed December 7, 1942, Jar capping apparatus, relating particularly to the cap chute and transfer mechanism by which the caps are transferred from the chute to the containers.

The present application also discloses subject matter disclosed and claimed in the copending joint application of Barnby and Hohl, Serial Number 468,096, filed December 7, 1942, Conveying and assembling apparatus, relating particularly to means for gripping the receptacles and moving them forward while the caps are being transferred thereto, and to means for starting the receptacles on their forward travel after they have been arrested at the cap sealing station.

The invention as herein illustrated is designed for attaching caps to glass jars while the latter are carried by an endless belt conveyor mechanism through a capping and sealing zone. Briefly, the machine in its general construction includes a lower portion or base comprising a casing 15 which provides a support for an endless belt conveyor frame 16. Within the casing 15 is an electric motor 17 operating through transmission gearing mounted in part within said casing, to drive the endless conveyor belts and to operate the sealing ram. Mounted directly over the casing 15 is a vertically adjustable frame or housing which includes a compartment 18 through which the conveyor extends and a compartment 19 or gear casing at one side thereof. The casing 19 is formed by a casting attached to the upper ends of posts 20 which are mounted in the lower frame 15 and adjustable therein as hereinafter described for lifting and lowering the upper housing 18, 19 and mechanism contained therein to correspond to the height of the containers which are being sealed.

The conveyor frame extends lengthwise through and beyond the housing 18 and includes parallel side rails 23 and an intermediate rail 24 forming a bottom support for the upper leads of a pair of endless conveyor belts 25. The rail 24 is formed with a rib 24ª extending lengthwise thereof between the belts. These rails are carried on standards 26 in which are journalled respectively a drive shaft 27 carrying a drive pulley 28 for the conveyor belts and a shaft 29 carrying a driven pulley 30 over which the belts are trained. Driving connections from the motor 17 to the conveyor drive shaft 27 include a belt 31 (Fig. 1) and pulley operating through worm gearing 32 to drive a vertical shaft 33 which operates through gears 34 to drive a horizontal shaft 35 journalled in the casing 15. The shaft 35 has driving connection through a sprocket chain 36, shaft 37, bevel gears 38, shaft 39, and worm gearing 40 to the drive shaft 27.

The jars or containers C are placed on the conveyor at one end of the machine and move continuously through the machine in the direction indicated by the arrows (Figs. 1 to 4) except while momentarily arrested by the capping mechanism. Cooperating with the belts 25 are side belts 41 arranged to grip the jars when they reach the sealing station and start them on their forward travel after they have been arrested momentarily by the sealing ram. The side belts 41 as shown in Figs. 3 and 4, are located wholly within the housing 18 and are trained over driving pulleys 42 and driven pulleys 43. The belts 41 are driven by the motor 17 operating through gearing including the aforementioned vertical shaft 33 (Figs. 1 and 7) which is made in telescoping sections, the upper tubular section 44 extending through and journalled in a bearing 45 in the upper wall of the lower casing 15. The section 44 is also journalled in the upper casing and has keyed to its upper end a bevel gear 47 which drives a gear 48 mounted on a horizontal shaft 49 which has a fixed mounting in the upper casing. Keyed to the gear 48 by a bolt 50, is a pinion 51 (Figs. 1 and 7) which drives a gear 52 keyed to a shaft 53. The latter has keyed thereto a sprocket gear 54 which operates through a sprocket chain 55 and gear 56 to drive a shaft 57 (Fig. 5) having journal bearings in the upper casing and a hanger 58. The shaft 57 operates through bevel gears 59 to drive the pair of vertical shafts 60 on which the drive pulleys 42 of the side belts are mounted. The gearing for driving the belts 25 and 41 is preferably proportioned to drive all the belts at the same linear speed.

Figure 5:
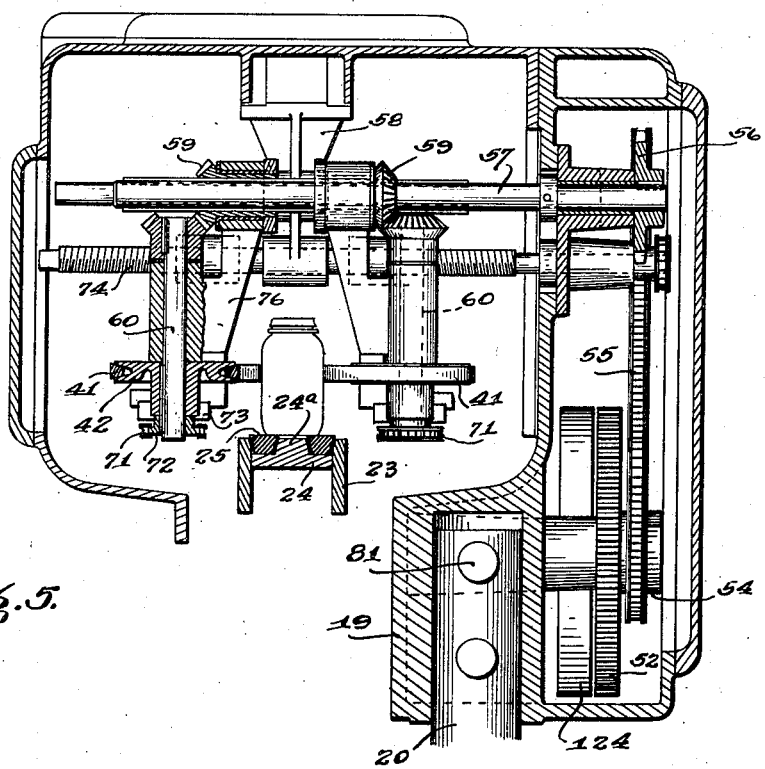
Fig. 5 is a cross-sectional view of the machine at the line 5—5 of Fig. 2, showing particularly the gearing for driving the side belts of the conveyor.
Figure 6:
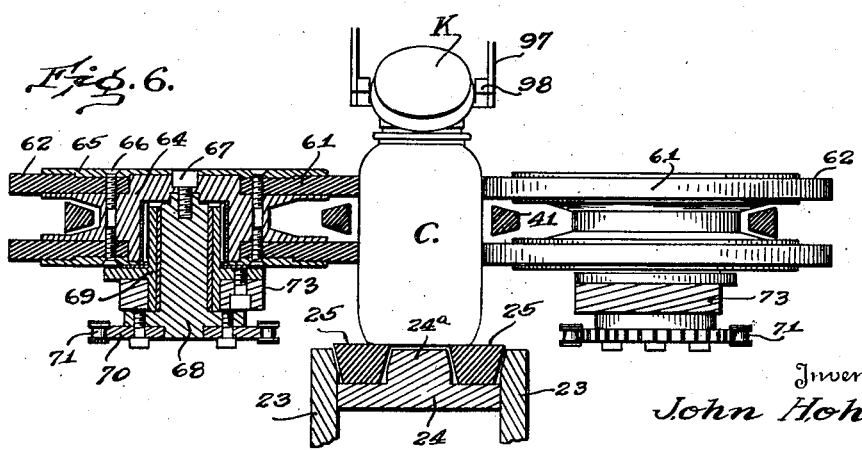
Fig. 6 is a part-sectional elevation showing a pair of feeding and supporting rolls between which the containers are held while the caps are being placed thereon.
Figure 10:
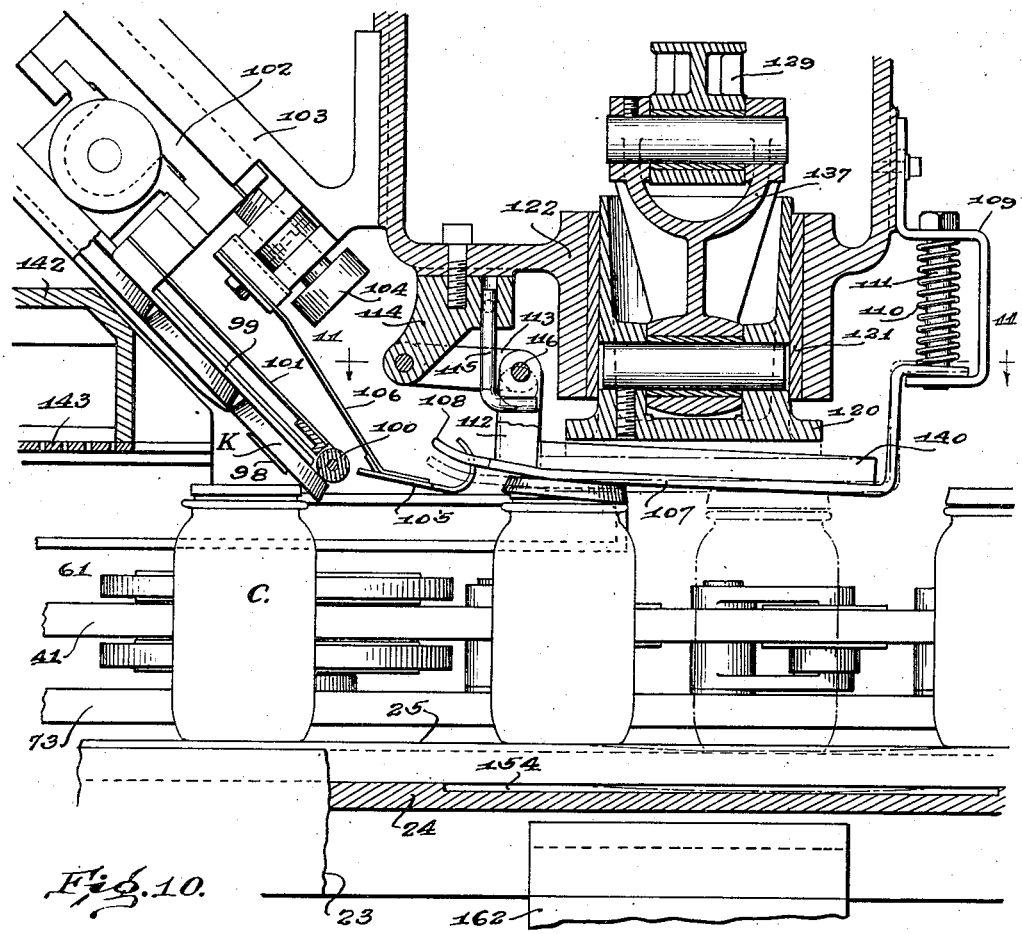
Fig. 10 is a part-sectional elevation showing the cap transferring and sealing mechanism.
Figure 11:
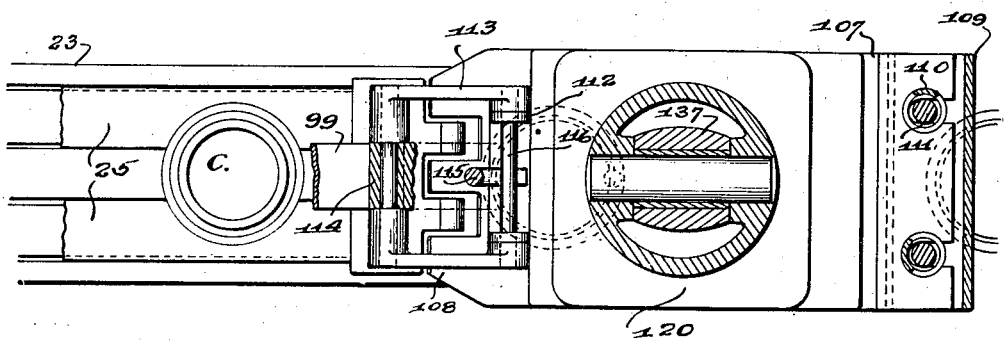
Fig. 11 is a section at the line 11—11 on Fig. 10.

The forward feeding movement of the containers C is supplemented at the point where the caps are placed on the containers by a pair of rolls 61 (Figs. 4, 6, and 10). Each of these rolls comprises a pair of disks 62 of rubber or other resilient friction material, which frictionally engage the side walls of the jars as the latter pass beneath the lower end of an inclined chute 63 through which the caps K are fed so that the rolls grip the jar and carry it forward while it pulls the cap from the chute as hereinafter described. As shown in Fig. 6, the disks 62 are attached to a hub 64 by clamping plates 65 and screws 66. The hub is in turn secured by means of a bolt 67 to a vertical shaft 68 journalled in a bushing 69. Secured to the lower ends of the shafts 68 are sprocket wheels 70 driven by sprocket chains 71 (Figs. 4, 5, and 6) trained over the gears 70 and sprocket gears 72 keyed to the lower ends of the shafts 60 (Fig. 5).

The pulleys 42, 43 over which the side belts 41 are trained, and also the rolls 61 are mounted in frames 73 which are adjustable laterally toward and from each other to accommodate containers of different diameters. The adjusting means includes a pair of adjusting shafts 74 and 75 (Figs. 1, 3, 5) formed with right and left-hand screw threads. The shaft 74 is journalled in the hanger 58 (Figs. 2, 3 and 5) and threaded through bearings in a pair of brackets 76 in which the shafts 60 are journalled and to which the belt frames 73 are attached. The shaft 75 has a similar mounting in bearing brackets 77 secured to the frames 73, the brackets being slidably mounted on a rod 78 journalled in a hanger 79 through which the screw shaft 75 extends. The adjusting shafts 74 and 75 are connected for simultaneous rotation by a sprocket chain 80 trained over sprocket gears on the said shafts. These shafts may be rotated by a wrench or tool applied to the squared end of either shaft, thereby adjusting the side belts 71 and also the rolls 61, toward and from each other.

Figure 9:
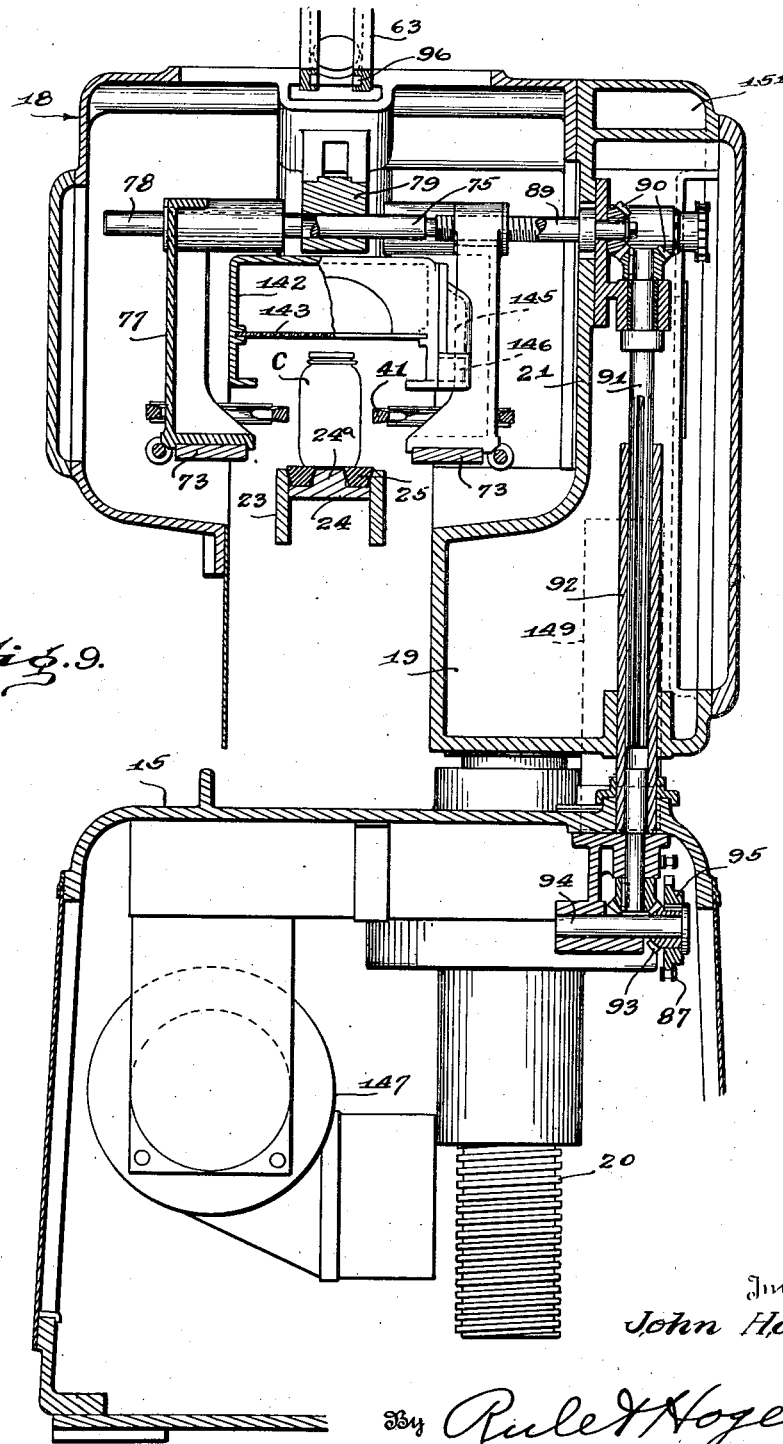
Fig. 9 is a sectional elevation at the line 9—9 on Fig. 2.

The upper housing 18, 19 with the mechanism carried therein, is mounted for up and down adjustment to adapt it to containers of different heights, by means now to be described. This housing is supported on the posts 20 which enter sockets 82 formed on the casting 19 and are secured therein by pins 81 (Figs. 1 and 5). The posts extend downward through bearing sleeves or bushings 83 which are mounted within the lower casing 15 and attached by bolts 84 to the upper wall of the casing. The posts are formed with screw threads 85. Worm gears 86 are threaded on the posts and rotatably supported on bearings which support the weight of the posts and mechanism carried thereby. The worm gears are simultaneously rotated by means of an endless sprocket chain 87 which is trained over sprocket gears on worm shafts 88 having driving connection with the worm gears. The sprocket chain 87 is driven manually for adjusting the posts up and down, by means of a wrench or hand tool applied to a shaft 89 (Figs. 1, 3, and 9). A pair of bevel gears 90 provides a driving connection between the shaft 89 and a vertical shaft comprising telescoping sections 91 and 92 which have a splined connection. The shaft section 92 has a driving connection through bevel gears 93 with a stud shaft 94 on which is keyed a sprocket wheel 95 which drives the chain 87. Manual rotation of the shaft 89 operates through the gear train just described to rotate the worm wheels 86 and thereby adjust the housing 18 and mechanism therein up and down.

The chute 63 includes a pair of spaced guide rails 96 (Fig. 9) which are grooved to form guideways for the marginal flanges of the caps K. At the lower end of the chute there is provided a pair of spring arms 97 (Fig. 6) carrying shoes 98 to releasably support each cap as it leaves the guideways and is brought to a position in which its lower side projects into the path of the jars C. Each jar as it enters the transfer zone, engages a cap and pulls it forward and as it advances, the cap is released from the shoes and swings down onto the jar. This downward movement is made positive by an overlying arm 99. A roll 100 is carried on the lower end of an inclined spring arm 101 anchored at its upper end to a carrier 102, mounted in a stationary bracket 103. The roll bears with a yielding pressure on the cap as the jar and cap advance beyond the chute. The chute is attached to the carrier and is adjustable therewith in a direction lengthwise of the chute by means of an adjusting screw 104. The mechanism for transferring the caps from the chute to the jars is more fully set forth and claimed in the above mentioned copending application Serial Number 468,094.

As the jar to which a cap has just been applied, moves forward, it passes beneath a guide 105 on the lower end of a spring arm 106 which holds the cap in position while the jar and cap move forward to a position beneath a ram shoe 107. This shoe is in the form of a horizontally disposed flat plate extending lengthwise over the path of the jars and having its rear end portion 108 upwardly and rearwardly inclined. The forward end of the shoe is offset upwardly and rests on a stationary bracket arm 109. The forward end of the shoe may yield upwardly against the compressive force of a coil spring 110 mounted on a rod 111 in the bracket 109. Arms 112 extending upwardly from the shoe are connected through links 113 to a bracket 114 attached to the framework. This construction permits the shoe to swing up and down to accommodate itself to the jars and caps therebeneath. The downward movement is limited by a stop rod 115 depending from the bracket 114 and having its lower end projecting beneath a pivot 116 of the links 113.

Figure 7:
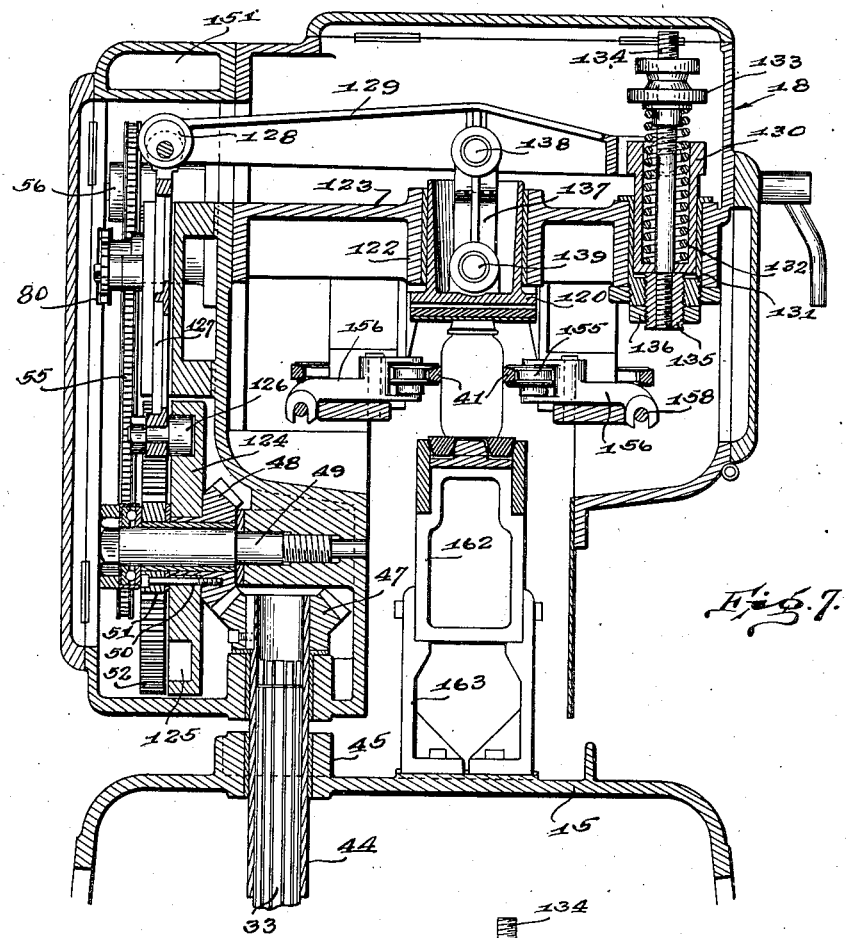
Fig. 7 is a cross-sectional elevation at the line 7—7 on Fig. 2 and shows the ram mechanism for driving the caps to sealing position.

The ram 120 for driving the caps into place on the jars is mounted to reciprocate up and down in a bushing 121 in a cylindrical bearing 122. The latter, as shown in Fig. 7, is cast integral with a beam 123 extending across and integral with the housing 18. The means for reciprocating the ram comprises a cam disk 124 (Figs. 1 and 7) formed with a cam groove 125 in which runs a cam follower roll 126 on the lower end of a vertical slide bar 127 mounted to slide up and down in stationary guides 127ª. The upper end of the slide bar has pivoted thereto an eccentric 128 which provides a link connection with one end of a horizontally disposed lever 129. The other end of the lever is forked to straddle a cylindrical member 130 mounted in a bearing 131 in the cross beam 123, and is connected to said member by pivot pins 131ª. A coil spring 132 housed in the member 130 is held under compression between the lower end of said member and a nut 133 threaded on a rod 134 extending through the housing. The lower end portion of the rod 134 is screw threaded to receive an internally threaded sleeve 135 which is also externally threaded for adjustment up and down in the bearing 131 and is held in adjusted position by a lock nut 136. The pivot pins 131ª provide a fulcrum for the lever 129 which may be adjusted up and down by means of the adjusting sleeve 135. The lever 129 is connected to the ram 120 through a link 137, the upper and lower ends of which are connected by pivots 138 and 139 to the lever and ram respectively. A cushioning pad 140 made of rubber, neoprene or other resilient, compressible material is interposed between the ram and the ram shoe 107.

The cam 124 is rotated continuously and operates through the lever 129 to reciprocate the ram. If there is no jar and cap beneath the ram shoe, the pad 140 is in its lowered position supported on the stop rod 115 with the pad 140 out of the range of movement of the ram. As a jar with a cap thereon moves beneath the ram shoe, it lifts the shoe from the dotted to the full line position (Fig. 10) so that as the ram moves downward, it imparts a blow or driving pressure through the pad and ram shoe to the cap. This forces the cap downward to sealing position or to an intermediate position depending on how far forward the jar has been moved when the ram operates. If the cap is not sealed by the first blow of the ram, a succeeding blow after the cap has reached a position directly beneath the ram, will complete the sealing operation. If the jar and cap will not permit the full down stroke of the lever 129 about the pivots 131ª as a fulcrum, the fulcrum point will be transferred to the pivot 138 and the movement will move the floating pivots 131ª upward against the compression force of the spring 132. The spring 110 permits the forward end of the ram shoe to yield upwardly to any extent necessary as a cap passes beneath the shoe. The sleeve 135 permits the fulcrum 131ª of the lever to be adjusted up and down for adapting the ram to the height of the jar and cap. The nut 133 permits adjustment of the compression of the spring for adjusting the sealing pressure applied by the ram.

When the machine is used for sealing jars while hot as when fruits, vegetables and the like are being packed, it is desirable to maintain the upper ends of the jars and caps in an atmosphere of steam while the caps are being applied and sealed to the jars. For this purpose steam is supplied through a pipe 141 (Figs. 2 and 3) to a steam chest 142 behind the chute 63 and extending lengthwise directly over the path of the jars. The floor 143 of the chest (Figs. 2, 9, and 10) is formed of foraminous material or provided with a multiplicity of perforations distributed throughout its area for the downward passage of the steam which is thereby caused to envelop the jars or the open upper ends thereof as they advance to the capping zone. At the forward end of the steam chest, a side port 144 opens into a passageway 145 (Fig. 9) which extends downward and opens into a horizontal forwardly extending passageway or chamber 146 (Figs. 9 and 2) open along its inner side to provide an atmosphere of steam for the caps while they are being applied to the jars.

The exhaust steam may be withdrawn from the housing 18 by a suction fan 147 (Fig. 1). A duct 148 extends from the fan and includes telescoping pipe sections 149, 150 connected respectively to the lower and upper casings 15 and 18. The upper section 150 opens into a duct 151 which extends lengthwise of the housing and at one end (Fig. 2) has a downward extension 152 which opens to the atmosphere. The duct 151 communicates with the interior of the housing through lateral passageways which may be located at intervals lengthwise of the housing. The exhaust steam and air drawn through the fan are discharged through a pipe 153 (Fig. 1).

Figure 8:
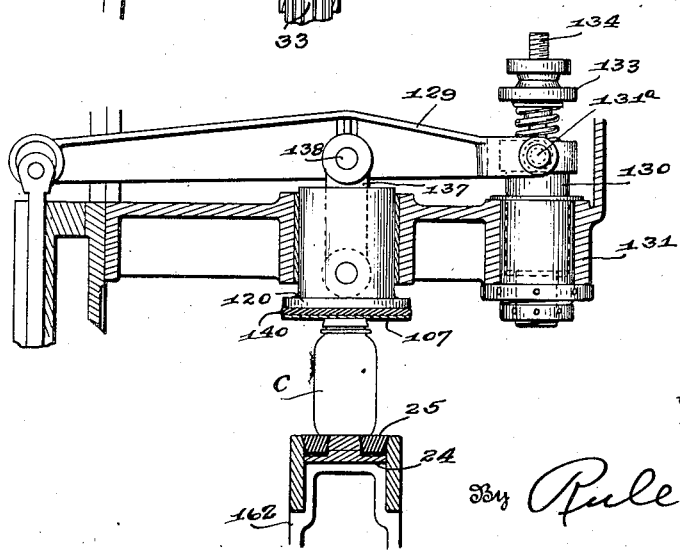
Fig. 8 is a part-sectional elevation of the ram device.

During the capping operation each jar is arrested in its forward movement and momentarily held stationary by the ram as it descends and applies pressure to the jar. In order to prevent interference with the continuous forward movement of the other jars and insure a quick start and acceleration of the jar to the speed of the conveyor after it has been momentarily arrested, mechanism is provided as follows: referring to Fig. 10, the rail 24 has portions thereof which extend beneath the ram, cut away to provide recesses 154 beneath the belts 25. When the ram applies downward pressure to a jar, the belts are deflected downward within the recesses 154 and the jar brought to rest on the rib 24ª (Fig. 8). The ram applies a rather high pressure to the jar so that it is held stationary while the belts 25 continue their travel.

In order to effect a quick starting and acceleration of the jars when the ram lifts, provision is made for bringing the side belts 41 into engagement with the jars after they have passed beyond the rolls 61 into the sealing zone, and holding the belts against the jars with a yielding pressure causing the jars to start forward from the cap sealing position, after which their continued forward travel is maintained by the belts 25. Referring to Fig. 4 such means includes a series of tension rolls 155 arranged in pairs positioned at short intervals lengthwise of the belts, each pair comprising rolls bearing inwardly on the two side belts. The rolls are carried on bell cranks 156 mounted on the conveyor frame. The rolls are held with a yielding pressure against the belts by means of coil springs 157 mounted on rods 158 each spring being held under compression between the bell crank arm and a stop 159 on the rod. The rolls 155 hold the side belts against the jars with sufficient pressure to insure each jar being quickly started forward after being arrested by the ram.

The supporting rails 23, 24 are reinforced by a supporting member or post 162 (Figs. 2, 7, and 10) located directly beneath the ram and mounted on brackets 163.

Modifications may be resorted to within the spirit and scope of my invention.

I claim:

1. A capping machine comprising a horizontally disposed endless conveyor, a motor geared to the conveyor for driving it continuously, a cam disk geared to the motor, a ram spaced above the conveyor and mounted for reciprocation toward and from the conveyor, a horizontally disposed lever extending transversely of the conveyor and positioned above the ram, a link connecting the ram to said lever at a point intermediate the ends of the lever, said cam disk having a cam track, a cam follower roll running in said track, a slide member carrying said cam follower roll and mounted for straight-line up and down movement, means providing a link connection between said slide member and one end of said lever, and means providing a stationary yieldable fulcrum for the other end of said lever.

2. A capping machine comprising a horizontally disposed endless conveyor, a motor geared to the conveyor for driving it continuously, a cam disk geared to the motor, a ram spaced above the conveyor and mounted for reciprocation toward and from the conveyor, a horizontally disposed lever extending transversely of the conveyor and positioned above the ram, a link connecting the ram to said lever at a point intermediate the ends of the lever, said cam disk having a cam track, a cam follower roll running in said track, a slide member carrying said cam follower roll and mounted for straight-line up-and-down movement, means providing a link connection between said slide member and one end of said lever, a coil spring, a tubular member forming a housing for said spring, a pivot connecting the other end of said lever to said member, a rod extending lengthwise within said housing and a nut threaded on said rod and holding the spring under compression, said nut being adjustable for adjustably varying the compression of the spring, said housing being movable upward against the compressive force of the spring when subjected to pressure applied upwardly through said lever.

3. Capping apparatus comprising, in combination, a support for a receptacle, a ram positioned over the support, a plate interposed between the ram and said support in position to overlie a receptacle with a cap loosely mounted thereon and with the plate spaced below the ram, means for holding said plate with a yielding downward pressure on said cap, and means for periodically lowering the ram and thereby applying pressure through said plate for sealing the cap to the receptacle.

4. Capping apparatus comprising, in combination, a support for a receptacle, a ram positioned over the support, a plate interposed between the ram and said support in position to overlie a receptacle with a cap loosely mounted thereon and with the plate spaced below the ram, means for holding said plate with a yielding downward pressure on said cap, means for periodically lowering the ram and thereby applying pressure through said plate for sealing the cap to the receptacle, and a pad of rubber-like material interposed between said plate and the ram.

5. The combination of a horizontally disposed conveyor, a ram positioned above the conveyor, means for driving the conveyor and thereby carrying receptacles with caps loosely placed thereon to a sealing position beneath the ram, a ram shoe mounted separately from the ram and spaced therefrom beneath the ram, said shoe being positioned to overlie the receptacle and cap as they advance toward sealing position, means for applying a yielding downward pressure through the shoe to the cap while the shoe is spaced below the ram, and means for moving the ram downward and pressing it against the shoe and thereby applying a sealing pressure through the shoe to the cap.

JOHN HOHL.